United States Patent
Lange (10) Patent No.: US 11,772,448 B2
(45) Date of Patent: Oct. 3, 2023

(54) VEHICLE SYSTEMS FOR CONTROLLING TEMPERATURE OF COMPARTMENTS FOR STORING HEMS

(71) Applicant: TOYOTA MOTOR NORTH AMERICA, INC., Plano, TX (US)

(72) Inventor: Armin Lange, Addison, TX (US)

(73) Assignee: Toyota Motor North America, Inc., Plano, TX (US)

( * ) Notice: Subject to any disclaimer, the term of this patent is extended or adjusted under 35 U.S.C. 154(b) by 176 days.

(21) Appl. No.: 16/690,919

(22) Filed: Nov. 21, 2019

(65) Prior Publication Data
US 2021/0155071 A1 May 27, 2021

(51) Int. Cl.
| | | |
|---|---|---|
| *B60H 1/00* | (2006.01) | |
| *B60P 3/20* | (2006.01) | |
| *G06Q 10/0832* | (2023.01) | |

(52) U.S. Cl.
CPC ..... *B60H 1/00271* (2013.01); *B60H 1/00735* (2013.01); *B60H 1/00878* (2013.01); *B60P 3/205* (2013.01); *G06Q 10/0832* (2013.01)

(58) Field of Classification Search
CPC ............ B60H 1/00592; B60H 1/00271; B60H 1/00735; B60H 1/00878; H04L 67/125; G06Q 10/0832; B60R 13/011; B60R 13/013; B60R 13/0268; B60R 5/044; B60R 5/042; B60R 5/00; B60R 5/003; B60R 5/045; B60R 3/10; B60R 3/102; B60R 3/104; B60R 3/105; B60P 3/205; B60P 3/20; B62D 33/048; B65D 2585/6867
See application file for complete search history.

(56) References Cited

U.S. PATENT DOCUMENTS

| 6,254,162 B1* | 7/2001 | Faber ........................ B60R 5/04 |
| --- | --- | --- |
| | | 224/539 |
| 6,375,055 B1* | 4/2002 | Spykerman ............... B60R 7/02 |
| | | 280/30 |
| 6,973,799 B2 | 12/2005 | Kuehl et al. |

(Continued)

FOREIGN PATENT DOCUMENTS

| CN | 102442263 A | 5/2015 |
| --- | --- | --- |
| CN | 206113214 U | 4/2017 |

(Continued)

OTHER PUBLICATIONS

DE-202018104197-U1 English machine translation (Year: 2018).*

*Primary Examiner* — Jenna M Hopkins
(74) *Attorney, Agent, or Firm* — Dinsmore & Shohl LLP (57) ABSTRACT

Systems and methods for controlling a temperature of a compartment of a vehicle are provided. The vehicle system includes a compartment, one or more processors, one or more memory modules communicatively coupled to the one or more processors; and machine readable instructions stored in the one or more memory modules that, when executed by the one or more processors, cause the one or more processors to receive information about an item; determine whether the item needs to be temperature controlled based on the information; and instruct a temperature control system to adjust a temperature of the compartment of the vehicle in response to determining the item needs to be temperature controlled.

18 Claims, 7 Drawing Sheets

(56) References Cited

U.S. PATENT DOCUMENTS

| | | | | |
|---|---|---|---|---|
| 7,201,421 | B2* | 4/2007 | Reynolds | B60R 7/02 296/37.16 |
| 7,934,761 | B2* | 5/2011 | Buehl | B60R 7/02 296/37.16 |
| 8,196,648 | B2* | 6/2012 | Matsukawa | B60N 3/104 165/202 |
| 8,757,695 | B2* | 6/2014 | Dinger | B60R 7/02 296/37.5 |
| 8,789,715 | B2* | 7/2014 | Shea | B65D 11/18 220/6 |
| 9,637,078 | B2* | 5/2017 | Bull | B60R 21/0132 |
| 9,639,909 | B2 | 5/2017 | Baldwin | |
| 10,029,618 | B2* | 7/2018 | Perez Astudillo | B60R 5/048 |
| 10,161,746 | B2 | 12/2018 | Ochsendorf et al. | |
| 10,384,615 | B2* | 8/2019 | Ito | B60R 5/04 |
| 10,399,501 | B2* | 9/2019 | Flores Marin | B60R 7/02 |
| 2003/0184107 | A1* | 10/2003 | Hapspel | B60R 7/02 296/24.4 |
| 2005/0001442 | A1* | 1/2005 | Cuma | B60J 5/101 296/26.09 |
| 2007/0194583 | A1* | 8/2007 | Coles | B60R 5/044 296/24.43 |
| 2007/0241154 | A1* | 10/2007 | Potts | B60R 7/02 224/539 |
| 2007/0265754 | A1 | 11/2007 | Curtis et al. | |
| 2009/0072567 | A1* | 3/2009 | Bohlke | B60R 5/045 242/389 |
| 2009/0218849 | A1* | 9/2009 | Rupar | B60R 5/04 296/182.1 |
| 2013/0289927 | A1* | 10/2013 | Smith | G06F 17/18 702/181 |
| 2015/0175080 | A1* | 6/2015 | Kmita | B60R 5/04 296/37.5 |
| 2016/0121780 | A1* | 5/2016 | Lee | B60P 3/20 296/24.35 |
| 2016/0144800 | A1* | 5/2016 | Henderson | B60R 5/04 296/24.4 |
| 2016/0371642 | A1* | 12/2016 | Wilkinson | G06Q 10/0832 |
| 2017/0291733 | A1* | 10/2017 | Henderson | B60R 7/04 |
| 2017/0292760 | A1* | 10/2017 | Dade | A47G 29/141 |
| 2018/0339658 | A1* | 11/2018 | Frederick | B60R 5/045 |
| 2019/0047460 | A1* | 2/2019 | Goldberg | G07F 17/0064 |
| 2019/0277647 | A1* | 9/2019 | Adetola | G01R 31/382 |
| 2020/0047587 | A1* | 2/2020 | Maeng | B60H 1/00264 |
| 2020/0090117 | A1* | 3/2020 | Luo | G06Q 10/083 |
| 2022/0024280 | A1* | 1/2022 | Austin | B60H 1/0073 |

FOREIGN PATENT DOCUMENTS

| | | | |
|---|---|---|---|
| CN | 208803083 U | 4/2019 | |
| DE | 202018104197 U1 * | 7/2018 | |
| WO | WO-2017141026 A1 * | 8/2017 | B60P 3/34 |

* cited by examiner

VEHICLE SYSTEMS FOR CONTROLLING TEMPERATURE OF COMPARTMENTS FOR STORING HEMS

TECHNICAL FIELD

Embodiments described herein generally relate to vehicle systems and, more specifically, to vehicle systems for controlling temperature of compartments for storing items based on information about the items.

BACKGROUND

The temperature inside a vehicle rises to a relatively high temperature on a hot sunny day. Food that requires cooling or freezing may go bad if placed in the vehicle at a high temperature. Some vehicles include a storage space for cooling items. However, it may take some time to cool the storage area of the vehicle to a desired temperature.

Accordingly, a need exists for a vehicle system that automatically control the temperature of a compartment for storing items before the user of the vehicle loads the items in the vehicle.

SUMMARY

In one embodiment, a vehicle system includes a compartment, one or more processors, one or more memory modules communicatively coupled to the one or more processors, and machine readable instructions stored in the one or more memory modules. The machine readable instructions, when executed by the one or more processors, cause the one or more processors to receive information about an item, determine whether the item needs to be temperature controlled based on the information, and instruct a temperature control system to adjust a temperature of the compartment of the vehicle in response to determining the item needs to be temperature controlled. The vehicle system may instruct a temperature control system to cool or heat the compartment of the vehicle if it is determined that the item needs to be cooled or heated.

In another embodiment, a system includes a server, and a vehicle includes a compartment, one or more processors, one or more memory modules communicatively coupled to the one or more processors, and machine readable instructions stored in the one or more memory modules that cause the one or more processors to perform at least the following when executed by the one or more processors: receive information about an item from the server, determine whether the item needs to be temperature controlled based on the information, and instruct a temperature control system to adjust a temperature of the compartment of the vehicle in response to determining the item needs to be temperature controlled.

In yet another embodiment, a method for controlling a compartment of a vehicle is provided. The method includes receiving, by a network interface hardware of the vehicle, information about an item, determining, by one or more processors of the vehicle, whether the item needs to be temperature controlled based on the information, and adjusting, by a temperature control system of the vehicle, a temperature of the compartment of the vehicle in response to determining the item needs to be temperature controlled.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vehicle systems for controlling the temperature of the compartment of a vehicle for storing items recently purchased. The vehicle system includes a compartment, one or more processors, one or more memory modules communicatively coupled to the one or more processors, and machine readable instructions stored in the one or more memory modules. The machine readable instructions, when executed by the one or more processors, cause the one or more processors to receive information about an item, determine whether the item needs to be temperature controlled based on the information, and instruct a temperature control system to adjust a temperature of the compartment of the vehicle in response to determining the item needs to be temperature controlled. The vehicle system may instruct a temperature control system to cool or heat the compartment of the vehicle if it is determined that the item needs to be cooled or heated.

In this regard, the vehicle system may provide compartments having a proper temperature for storing purchased items. For example, when a customer buys a carton of milk or eggs at a store on a hot summer day, the vehicle system cools the enclosed space of the compartment of the vehicle such that the milk or the eggs may be stored in the cooled space for an extended period of time without being spoiled. In addition, the vehicle system according to the present disclosures enhances energy efficiency for cooling an item by generating a compartment of a size comparable to the size of the item. The various vehicle systems for controlling the temperature of the compartment of a vehicle will be described in more detail herein with specific reference to the corresponding drawings.

Figure 1:
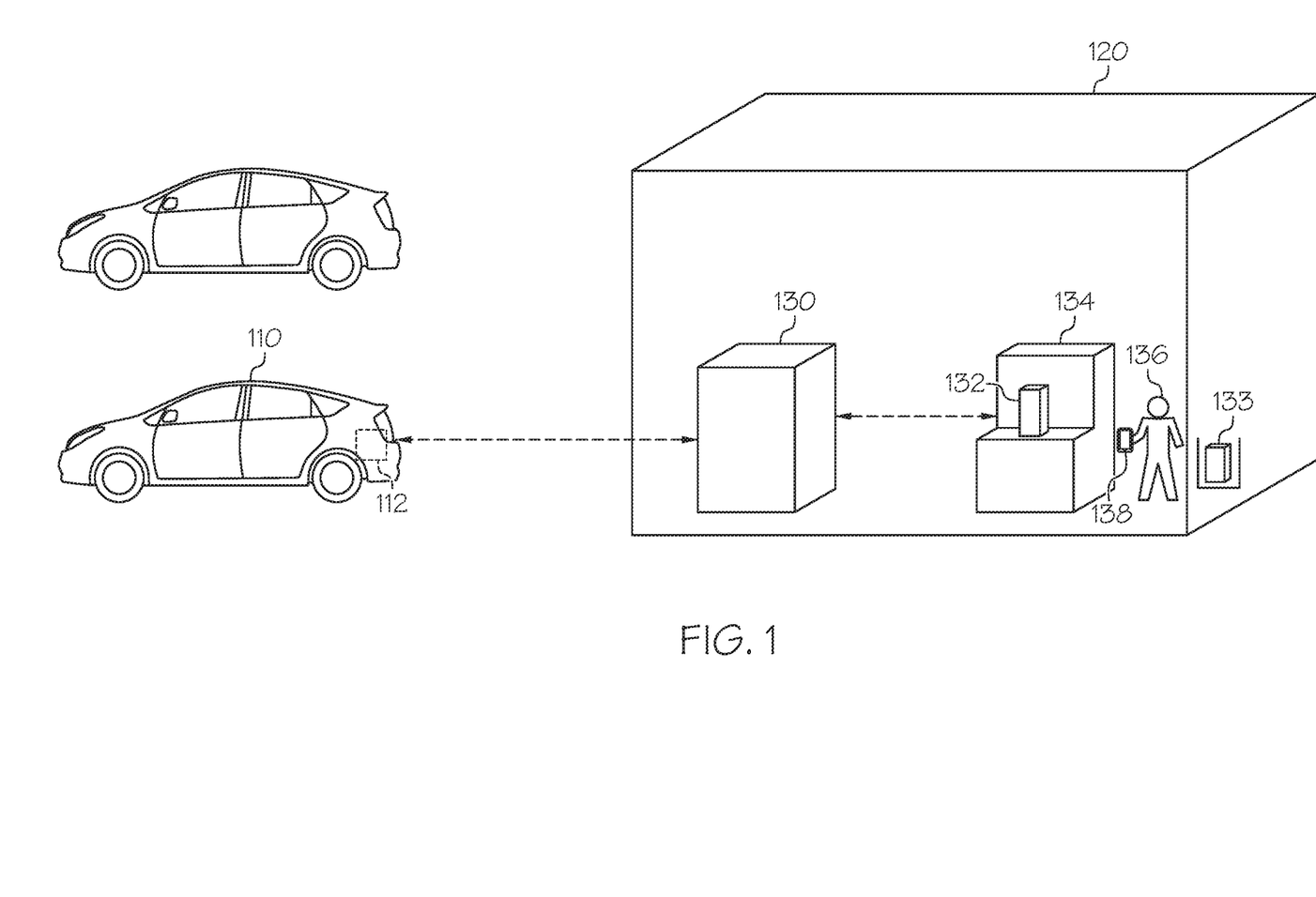
FIG. 1 schematically depicts a system for adjusting a temperature of a compartment of a vehicle in response to purchasing an item, according to one or more embodiments shown and described herein.

FIG. 1 schematically depicts a system for adjusting a temperature of a compartment of a vehicle in response to purchasing an item, according to one or more embodiments shown and described herein. In embodiments, a store 120 may include a server 130 and an item scanner 134. A customer 136 may purchase an item 132 using the item scanner 134. The item scanner 134 reads information about the item 132 and transmits information about the item 132 to the server 130. The information about the item 132 may include, but is not limited to, a dimension of the item, a weight of the item, an expiration date of the item, a desired temperature for storing the item, and storage information with respect to the item (e.g., whether the item needs to be kept frozen, cooled, heated or the like). The customer 136 may input his membership information when checking out the item. For example, the customer 136 may scan her membership card, or input his phone number associated with the membership.

In embodiments, the server 130 may transmit the information about the item 132 to the vehicle 110 of the customer 136. The vehicle 110 may be a vehicle including an automobile or any other passenger or non-passenger vehicle such as, for example, a terrestrial, aquatic, and/or airborne vehicle. For example, the vehicle 110 may be a truck having a container. In some embodiments, the vehicle may be an autonomous vehicle that navigates its environment with limited human input or without human input, e.g., an e-palette. In another embodiment, the vehicle 110 may be an unmanned aerial vehicle (UAV), commonly known as a drone.

For example, the server 130 may retrieve information about the customer 136 based on the membership information and transmit information about the item 132 to the customer's vehicle 110 based on the customer's information. As another example, the server 130 may transmit the information about the item 132 to a mobile device 138 of the customer 136. Then, the mobile device 138 may transfer the information about the item 132 to the vehicle 110 of the customer 136. As another example, the item scanner 134 may transmit information about the scanned item 132 to the mobile device 138 of the customer 136, which in turn transmits the information about the scanned item 132 to the vehicle 110. As another example, the customer 136 may make a payment for the item 132 using the mobile device 138 and the information about the item may be transmitted to the mobile device 138 after making the payment. Then, the mobile device 138 may transmit the information about the item 132 to the vehicle 110.

The vehicle 110 may receive information about the item 132 from the server 130 or the mobile device 138. In embodiments, the vehicle 110 may determine whether the item 132 needs to be cooled based on the information about the item 132. For example, if the information about the item 132 indicates that the item 132 is a frozen food, the vehicle 110 may determine that the item 132 needs to be cooled. If it is determined that the item 132 needs to be cooled, the vehicle 110 may instruct a temperature control system to cool a compartment 112 of the vehicle 110 such that when the customer 136 arrives at the vehicle 110 with the item 132, the inside of the compartment 112 may be maintained at a relative low temperature, for example, a temperature substantially lower than a room temperature or temperature outside. In some embodiments, the vehicle 110 may be a truck, and the compartment 112 may be a portion of the container of the truck.

In some embodiments, the vehicle 110 may determine whether the item 132 needs to be heated based on the information about the item 132. For example, if the information about the item 132 indicates that the item 132 is a cooked rotisserie chicken, the vehicle 110 may determine that the item 132 needs to be heated. If it is determined that the item 132 needs to be heated, the vehicle 110 may instruct a temperature control system to heat a compartment 112 of the vehicle 110 such that when the customer 136 arrives at the vehicle 110 with the item 132, the inside of the compartment 112 may be maintained at a relatively high temperature, for example, a temperature substantially higher than a room temperature or temperature outside.

Figure 2:
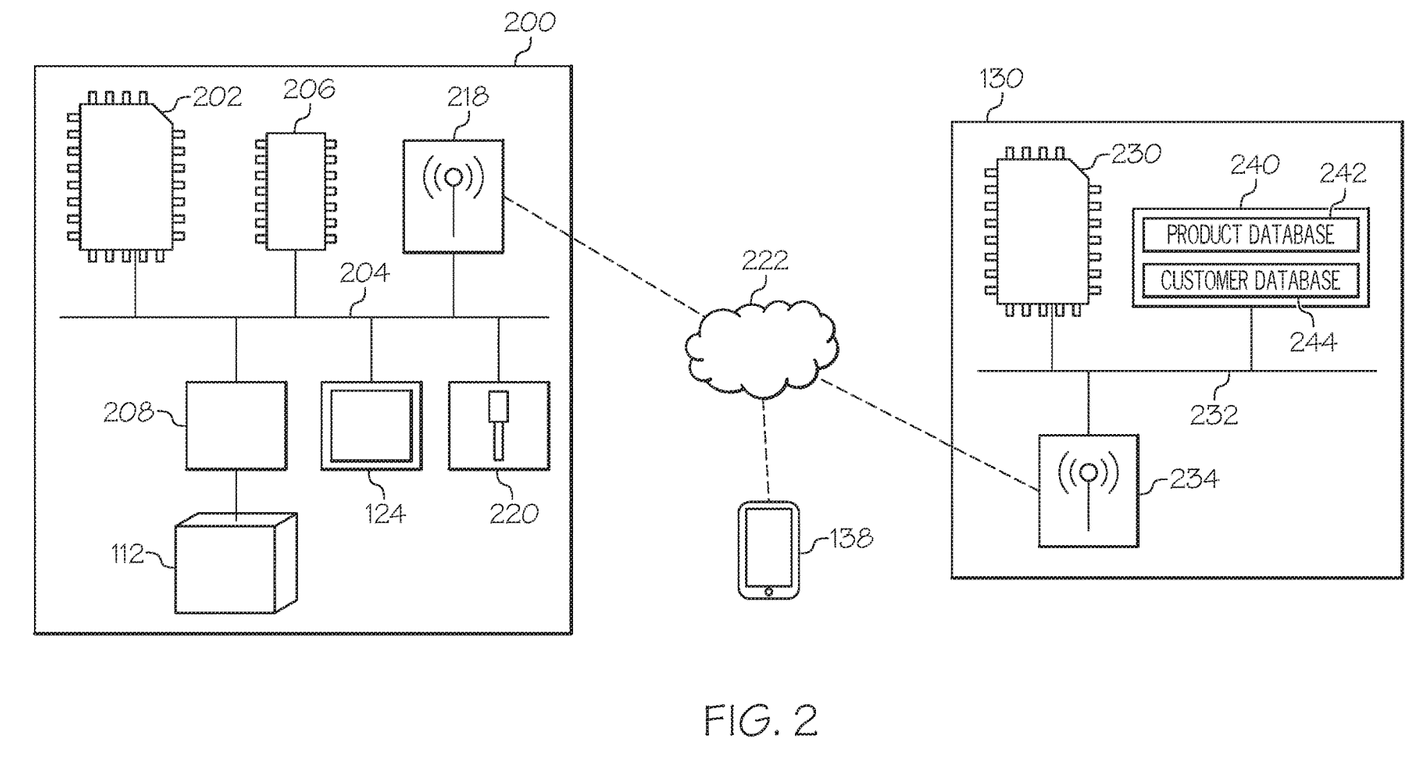
FIG. 2 schematically depicts a vehicle system communicating with the server at a store and a mobile device of a customer, according to one or more embodiments shown and described herein.

FIG. 2 schematically depicts a vehicle system 200 communicating with the server 130 at a store and a mobile device 138 of a customer, according to one or more embodiments shown and described herein. It should be understood that the vehicle system 200 may be integrated with the vehicle 110 or may be embedded within a mobile device (e.g., smartphone, laptop computer, etc.) carried by a driver of the vehicle.

The vehicle system 200 includes one or more processors 202, a communication path 204, one or more memory modules 206, a display 124, a temperature control system 208, a compartment 112, a network interface hardware 218, and a satellite antenna 220. The various components of the vehicle system 200 and the interaction thereof will be described in detail below.

As noted above, the vehicle system 200 includes the communication path 204. The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 204 communicatively couples the various components of the vehicle system 200. As used herein, the term "communicatively coupled" means that coupled components are capable of exchanging data signals with one another such as, for example, electrical signals via conductive medium, electromagnetic signals via air, optical signals via optical waveguides, and the like.

As noted above, the vehicle system 200 includes the one or more processors 202. Each of the one or more processors 202 may be any device capable of executing machine readable instructions. Accordingly, each of the one or more processors 202 may be a controller, an integrated circuit, a microchip, a computer, or any other computing device. The one or more processors 202 are communicatively coupled to the other components of the vehicle system 200 by the communication path 204. Accordingly, the communication path 204 may communicatively couple any number of processors with one another, and allow the modules coupled to the communication path 204 to operate in a distributed computing environment. Specifically, each of the modules may operate as a node that may send and/or receive data.

As noted above, the vehicle system 200 includes the one or more memory modules 206. Each of the one or more memory modules 206 of the vehicle system 200 is coupled to the communication path 204 and communicatively coupled to the one or more processors 202. The one or more memory modules 206 may comprise RAM, ROM, flash memories, hard drives, or any device capable of storing machine readable instructions such that the machine readable instructions may be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the one or more memory modules 206 include machine readable instructions that, when executed by the one or more processors 202, cause the vehicle system 200 to perform the actions described below with reference to FIGS. 4, 5 and 7.

As noted above, the vehicle system 200 includes a temperature control system 208. The temperature control system 208 monitors ambient conditions of the vehicle 110 and adjusts the ambient conditions within the vehicle 110. For example, the temperature control system 208 can be configured to provide conditioned air throughout a passenger compartment of the vehicle 110. The temperature control system 208 may be connected to a compartment 112 and control a temperature of the compartment. The compartment 112 may include an enclosed area inside the compartment 112 and the temperature control system 208 may control the temperature of the enclosed area. The compartment 112 may include a temperature sensor for sensing the temperature of the enclosed area. The temperature of the enclosed area may be different from the temperature of the rest of the space of the vehicle, e.g., the passenger compartment. As used herein, the term "conditioned air" can mean air received from outside of the vehicle 110 that has been modified by the temperature control system 208 such as, for example, via heating, cooling, pressurizing, altering humidity, or the like. The temperature control system 208 can deliver the conditioned air throughout the vehicle 110 or to the compartment 112 using, for example, a blower fan, ducting, and vents. Alternatively or additionally, the temperature control system 208 can be configured to deliver unconditioned air throughout the vehicle 110 or to the compartment 112 using the blower fan, ducting, and vents. The temperature control system 208 can comprise a processor for controlling the temperature control system 208. Alternatively or additionally, the temperature control system 208 can be controlled by the one or more processors 202. Accordingly, the temperature control system 208 can be communicatively coupled to the communication path 204.

Still referring to FIG. 2, the vehicle system 200 comprises the display 124 for providing visual output such as, for example, information, entertainment, maps, navigation, information, or a combination thereof. The display 124 is coupled to the communication path 204 and communicatively coupled to the one or more processors 202. Accordingly, the communication path 204 communicatively couples the display 124 to other modules of the vehicle system 200. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 124 may include at least one of the one or more processors 202 and the one or memory modules 206. The display 124 may display a temperature of the passenger cabin or the compartment 112. For example, the display 124 may display "The temperature of the compartment is 68 Fahrenheit."

As noted above, the vehicle system 200 includes the network interface hardware 218 for communicatively coupling the vehicle system 200 with the server 130 or the mobile device 138 via a network 222. The network interface hardware 218 is coupled to the communication path 204 such that the communication path 204 communicatively couples the network interface hardware 218 to other modules of the vehicle system 200. The network interface hardware 218 may be any device capable of transmitting and/or receiving data via a wireless network. Accordingly, the network interface hardware 218 may include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 218 includes a Bluetooth transceiver that enables the vehicle system 200 to exchange information with the mobile device 138 (e.g., a smartphone) via Bluetooth communication.

Still referring to FIG. 2, data from various applications running on the mobile device 138 may be provided from the mobile device 138 to the vehicle system 200 via the network interface hardware 218. The mobile device 138 may be any device having hardware (e.g., chipsets, processors, memory, etc.) for communicatively coupling with the network interface hardware 218 and a network 222. Specifically, the mobile device 138 may include an antenna for communicating over one or more of the wireless computer networks described above. Moreover, the mobile device 138 may include a mobile antenna for communicating with the network 222. Accordingly, the mobile antenna may be configured to send and receive data according to a mobile telecommunication standard of any generation (e.g., 1G, 2G, 3G, 4G, 5G, etc.). Specific examples of the mobile device 138 include, but are not limited to, smart phones, tablet devices, e-readers, laptop computers, or the like.

The network 222 generally includes a plurality of base stations that are configured to receive and transmit data according to mobile telecommunication standards. The base stations are further configured to receive and transmit data over wired systems such as public switched telephone network (PSTN) and backhaul networks. The network 222 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the network 222 may be utilized as a wireless access point by the network interface hardware 218 or the mobile device 138 to access one or more servers (e.g., the server 130). The server 130 includes one or more processors 230, one or more memory modules 240, a communication path 232, and a network interface hardware 234. In some embodiments, the vehicle system 200 may communicate with the server 130 or the mobile device 138 via vehicle-to-everything (V2X) communication.

Each of the one or more processors 230 may be any device capable of executing machine readable instructions. Accordingly, each of the one or more processors 230 may be a controller, an integrated circuit, a microchip, a computer, or any other computing device. The one or more processors 230 are communicatively coupled to the other components of the server 130 by the communication path 232. Accordingly, the communication path 232 may communicatively couple any number of processors with one another, and allow the modules coupled to the communication path 232 to operate in a distributed computing environment. Specifically, each of the modules may operate as a node that may send and/or receive data.

As noted above, the server 130 includes the one or more memory modules 240. Each of the one or more memory modules 240 of the server 130 is coupled to the communication path 232 and communicatively coupled to the one or more processors 230. The one or more memory modules 240 may comprise RAM, ROM, flash memories, hard drives, or any device capable of storing machine readable instructions such that the machine readable instructions may be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 240. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 240 include product database 242 and customer database 244. The product database 242 includes information about products in the store 120. For example, information about the products may include, but not be limited to, product identifications, product dimensions, product weights, product expiration dates, desired temperature for storing the item such as whether the item needs to be kept frozen, cooled, heated or the like. The one or more memory modules 240 may include customer database 244. The customer database 244 may include information about customers or members. For example, the information about customers or members may include, but not be limited to, identification about customers or members, purchase history of the customers or members, contact information about the customers or members such mobile device numbers, email addresses, information about vehicles of the customers or members, and the like.

In embodiments, the one or more memory modules 240 include machine readable instructions that, when executed by the one or more processors 230, cause the server 130 to perform the actions described below with reference to FIGS. 4, 5 and 7.

As noted above, the vehicle system 200 optionally includes a satellite antenna 220 coupled to the communication path 204 such that the communication path 204 communicatively couples the satellite antenna 220 to other modules of the vehicle system 200. The satellite antenna 220 is configured to receive signals from global positioning system satellites. Specifically, in one embodiment, the satellite antenna 220 includes one or more conductive elements that interact with electromagnetic signals transmitted by global positioning system satellites. The received signal is transformed into a data signal indicative of the location (e.g., latitude and longitude) of the satellite antenna 220 or an object positioned near the satellite antenna 220, by the one or more processors 202.

Additionally, it is noted that the satellite antenna 220 may include at least one of the one or more processors 202 and the one or memory modules 206. In embodiments where the vehicle system 200 is coupled to a vehicle, the one or more processors 202 execute machine readable instructions to transform the global positioning satellite signals received by the satellite antenna 220 into data indicative of the current location of the vehicle 110.

While the vehicle system 200 includes the satellite antenna 220 in the embodiment depicted in FIG. 2, the vehicle system 200 may not include the satellite antenna 220 in other embodiments, such as embodiments in which the vehicle system 200 does not utilize global positioning satellite information. The location of the vehicle 110 may be transmitted to the server 130. Based on the location of the vehicle 110, the server 130 may determine whether the vehicle is proximate to the store 120 or not, for example, whether the vehicle is on the parking lot of the store 120.

In some embodiments, the server 130 may transmit information about an item (e.g., the item 132 in FIG. 1) to a vehicle within a threshold distance from the store 120. For example, the threshold distance may be 500 feet. If a vehicle is within 500 feet of the store 120, the store 120 may transmit information about the item to the vehicle. In return, the vehicle may cool the compartment of the vehicle using a temperature control system. If the vehicle is not within 500 feet of the store 120, the store 120 may not transmit information about the item to the vehicle. This may prevent the vehicle from unnecessarily heating or cooling the compartment when the vehicle is not within the threshold distance from the store 120. Specifically, in some embodiment, when the customer 136 is purchasing an item at a store, but has left her vehicle at home (e.g., came to the store by taking public transportation or another's vehicle), the store does not transmit information about the item 132 to the vehicle in order to prevent any unnecessary heating or cooling of the vehicle.

Still referring to FIG. 2, it should be understood that the vehicle system 200 may be formed from a plurality of modular units, i.e., the temperature control system 208, the compartment 112, or the display 124 may be formed as modules that when communicatively coupled form the vehicle system 200. Accordingly, in some embodiments, each of the modules may include at least one of the one or more processors 202 and/or the one or more memory modules 206. Accordingly, it is noted that, while specific modules may be described herein as including a processor and/or a memory module, the embodiments described herein may be implemented with the processors and memory modules distributed throughout various communicatively coupled modules.

Figure 3:
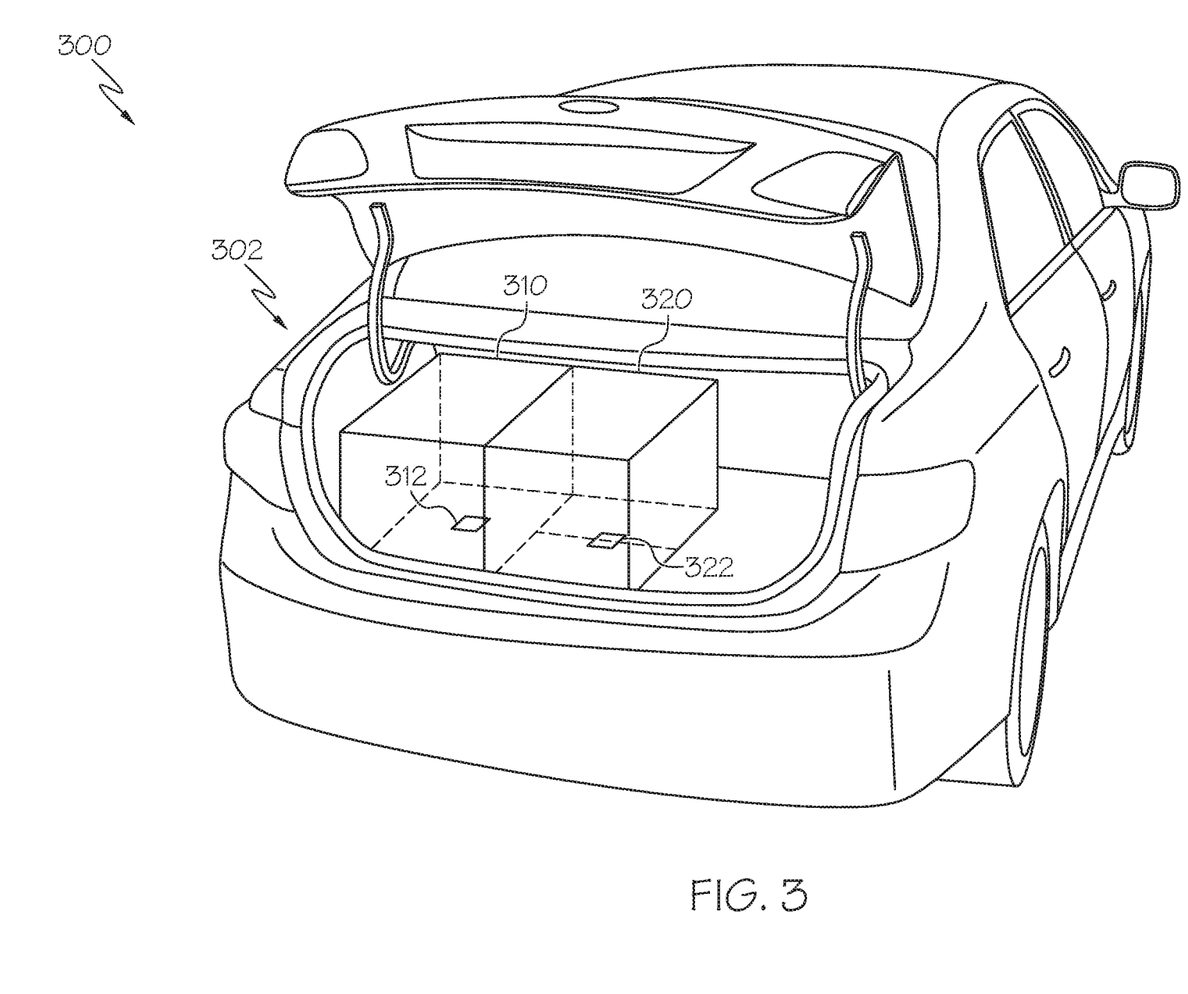
FIG. 3 depicts compartments of a vehicle for storing items, according to one or more embodiments shown and described herein.

FIG. 3 depicts compartments of a vehicle for storing items, according to one or more embodiments shown and described herein. In embodiments, a vehicle 300 may include two compartments 310 and 320 in a trunk 302. Each of the compartments 310 and 320 may include a lid or a cover such that the user of the vehicle may open the compartment and place items inside. While FIG. 3 depicts the two compartments, the vehicle 300 may include more than or less than two compartments. The locations of the compartments are not limited to the trunk of the vehicle 300. For example, compartments may be located within a passenger cabin. Each of the compartments 310 and 320 may include an enclosed area inside. Each of the compartments 310 and 320 may be connected to the temperature control system 208 via the inlets 312 and 322, respectively. The temperature control system 208 may provide cooled or heated air to the compartments 310 and 320 via the inlets 312 and 322, respectively. The temperature of the enclosed area of the compartment 310 may be maintained at a temperature different from the temperature of the enclosed area of the compartment 320.

Figure 4:
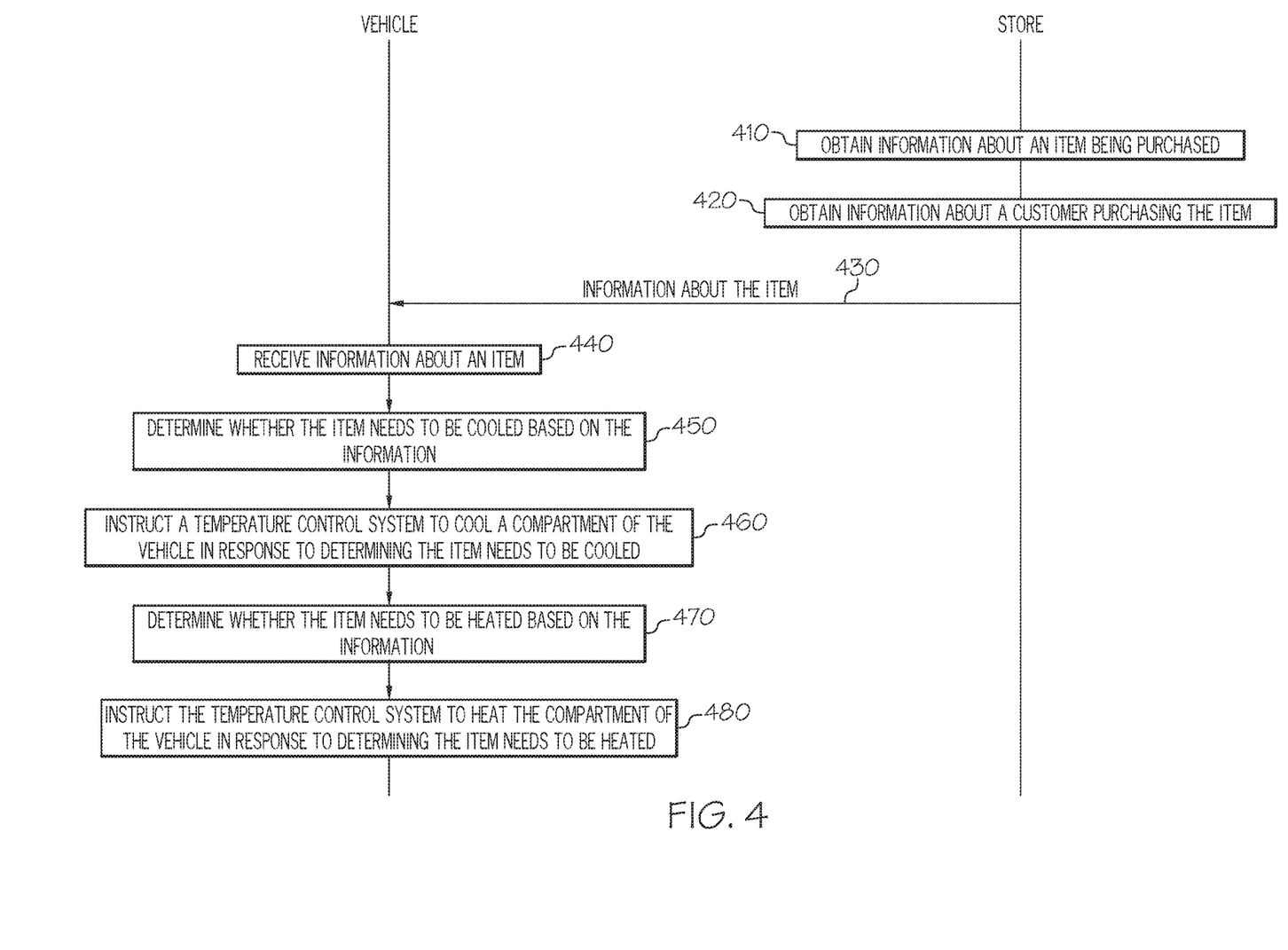
FIG. 4 depicts a flowchart for controlling the temperature of the compartment of a vehicle based on information about an item, according to one or more embodiments shown and described herein.

FIG. 4 depicts a flowchart for controlling the temperature of the compartment of a vehicle based on information about an item, according to one or more embodiments shown and described herein.

In step 410, the store 120 may obtain information about an item being purchased. In embodiments, by referring to FIG. 1, the customer 136 may purchase an item 132 using the item scanner 134. The item scanner 134 reads information about the item 132. The information about the item 132 may include, but is not limited to, a dimension of the item, a weight of the item, an expiration date, a desired temperature for storing the item, and storage information with respect to the item (e.g., whether the item needs to be kept frozen, cooled, heated, or the like). The customer 136 may input his membership information when checking out.

Referring back to FIG. 4, in step 420, the store 120 may obtain information about a customer purchasing the item. In embodiments, the server 130 of the store 120 may retrieve information about the customer based on membership information. For example, the item scanner 134 may receive membership information about the customer 136 when the customer 136 scans her membership card or inputs her membership information.

Referring back to FIG. 4, in step 430, the store 120 may transmit information about the item to the vehicle 110. In embodiments, the server 130 of the store 120 may transmit the information about the item 132 to the vehicle 110 for the customer 136. For example, by referring to FIG. 1, the server 130 may retrieve information about the customer based on the membership information and transmit information about the item 132 to the customer's vehicle 110 based on the customer's information. As another example, the server 130 may transmit the information about the item 132 to a mobile device 138 of the customer 136. Then, the mobile device 138 may transfer the information about the item 132 to the vehicle 110 of the customer 136. As another example, the item scanner 134 may transmit information about the scanned item 132 to the mobile device 138 of the customer 136 which in turn may transmit the information about the scanned item 132 to the vehicle 110. As another example, the customer 136 may make a payment for the item 132 using the mobile device 138 and the information about the item may be transmitted to the mobile device 138 after making the payment. Then, the mobile device 138 may transmit the information about the item 132 to the vehicle 110.

Referring back go FIG. 4, in step 440, the vehicle 110 may receive information about the item. For example, by referring to FIGS. 1 and 2, the vehicle system 200 may receive information about the item 132 from the server 130 via vehicle-to-everything (V2X) communication or via the network 222. As another example, the vehicle system 200 may receive information about the item 132 from the mobile device 138 of the customer 136 via the network 222.

Referring back to FIG. 4, in step 450, the vehicle 110 may determine whether the item 132 needs to be cooled based on the information. For example, by referring to FIGS. 1 and 2, if the information about the item 132 indicates that the item 132 is a frozen food, the vehicle system 200 may determine that the item 132 needs to be cooled.

Referring back to FIG. 4, in step 460, the vehicle 110 may instruct a temperature control system to cool a compartment of the vehicle in response to determining the item needs to be cooled. By referring to FIGS. 1 and 2, if it is determined that the item 132 needs to be cooled, the vehicle system 200 may instruct the temperature control system, e.g., the temperature control system 208, to cool a compartment 112 of the vehicle 110 such that when the customer 136 arrives at the vehicle 110, the inside of the compartment 112 may be maintained at a relative low temperature, for example, a temperature substantially lower than a vehicle room temperature or the temperature outside of the vehicle.

Referring back to FIG. 4, in step 470, the vehicle 110 may determine whether the item needs to be heated based on the information about the item. For example, by referring to FIGS. 1 and 2, the vehicle system 200 may determine whether the item 132 needs to be heated based on the information about the item 132. Specifically, if the information about the item 132 indicates that the item 132 is a cooked rotisserie chicken, the vehicle 110 may determine that the item 132 needs to be heated.

Referring back to FIG. 4, in step 480, the vehicle 110 may instruct the temperature control system to heat the compartment of the vehicle in response to determining the item needs to be heated. By referring to FIGS. 1 and 2, if it is determined that the item 132 needs to be heated, the vehicle system 200 may instruct a temperature control system, e.g., the temperature control system 208 to heat the compartment 112 of the vehicle 110 such that when the customer 136 arrives at the vehicle 110, the inside of the compartment 112 may be maintained at a relatively high temperature, for example, a temperature substantially higher than a room temperature or temperature outside.

Figure 5:
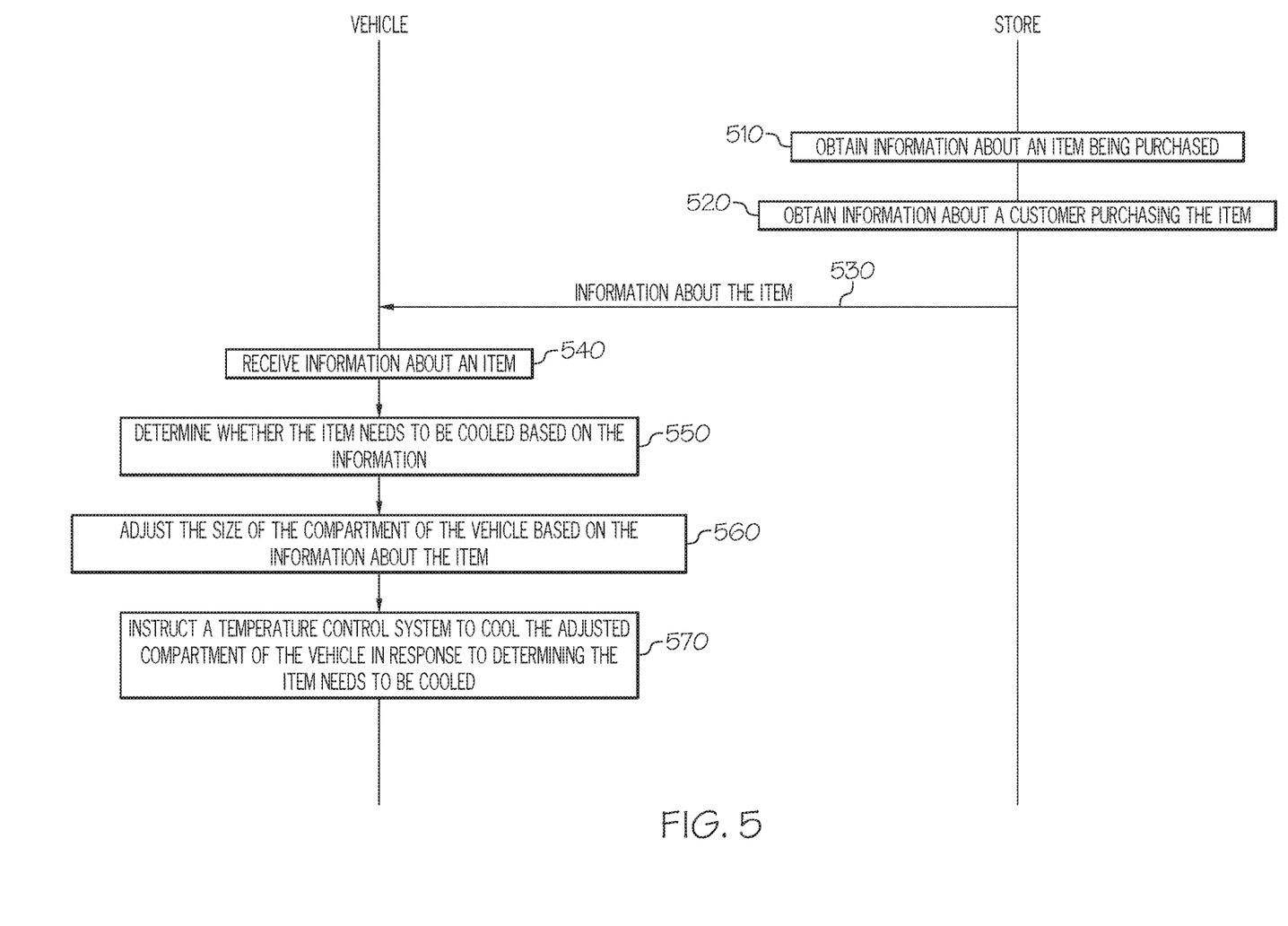
FIG. 5 depicts a flowchart for controlling the temperature of the compartment of a vehicle based on information about an item, according to another embodiment shown and described herein.

FIG. 5 depicts a flowchart for controlling the temperature of the compartment of a vehicle based on information about an item, according to another embodiment shown and described herein.

In step 510, the store 120 may obtain information about an item being purchased, similar to the step 410 described above. In step 520, the store 120 may obtain information about a customer purchasing the item, similar to the step 420 described above. In step 530, the store 120 may transmit information about the item to the vehicle 110, similar to the step 430 described above.

In step 540, the vehicle 110 may receive information about the item. For example, by referring to FIGS. 1 and 2, the vehicle system 200 may receive information about the item 132 from the server 130 via vehicle-to-everything (V2X) communication or via the network 222. As another example, the vehicle system 200 may receive information about the item 132 from the mobile device 138 of the customer 136 via the network 222.

Referring back to FIG. 5, in step 550, the vehicle 110 may determine whether the item 132 needs to be cooled based on the information. For example, by referring to FIGS. 1 and 2, if the information about the item 132 indicates that the item 132 is a frozen food, the vehicle system 200 may determine that the item 132 needs to be cooled.

Referring back to FIG. 5, in step 560, the vehicle 110 may adjust the size of the compartment of the vehicle 110 based on the information about the item. In embodiment, the compartment of the vehicle 110 may be generated based on the information about the item 132. For example, the information about the item 132 may include the dimension of the item 132 including the height, the width, and the length of the item 132. Based on the dimension of the item 132, the vehicle 110 may generate a compartment for storing the item 132. Specifically, by referring to FIG. 6, the trunk 602 of a vehicle may erect walls 610, 612, 614, and 616 to build a compartment. For example, walls 610, 612, 614, and 616 may be integrated within the bottom of the vehicle and may rise in response to being driven by one or more electric motors. The top of the compartment may be covered by a lid, a cover, or the like such that the compartment includes an enclosed area. One or more of the walls 610, 612, 614, and 616 may move in +x or −x direction, +y or −y direction, or +z or −z direction such that the item 132 may fit into the enclosed area of the compartment 620. For example, if the width of the item 132 is 10 inches, the length of the item 132 is 8 inches, and the height of the item 132 is 5 inches, the vehicle 110 may generate a compartment whose enclosed area is slightly bigger than the item, e.g., 8.5 inches of length, 10.5 inches of width, and 5.5 inches of height.

Figure 6:
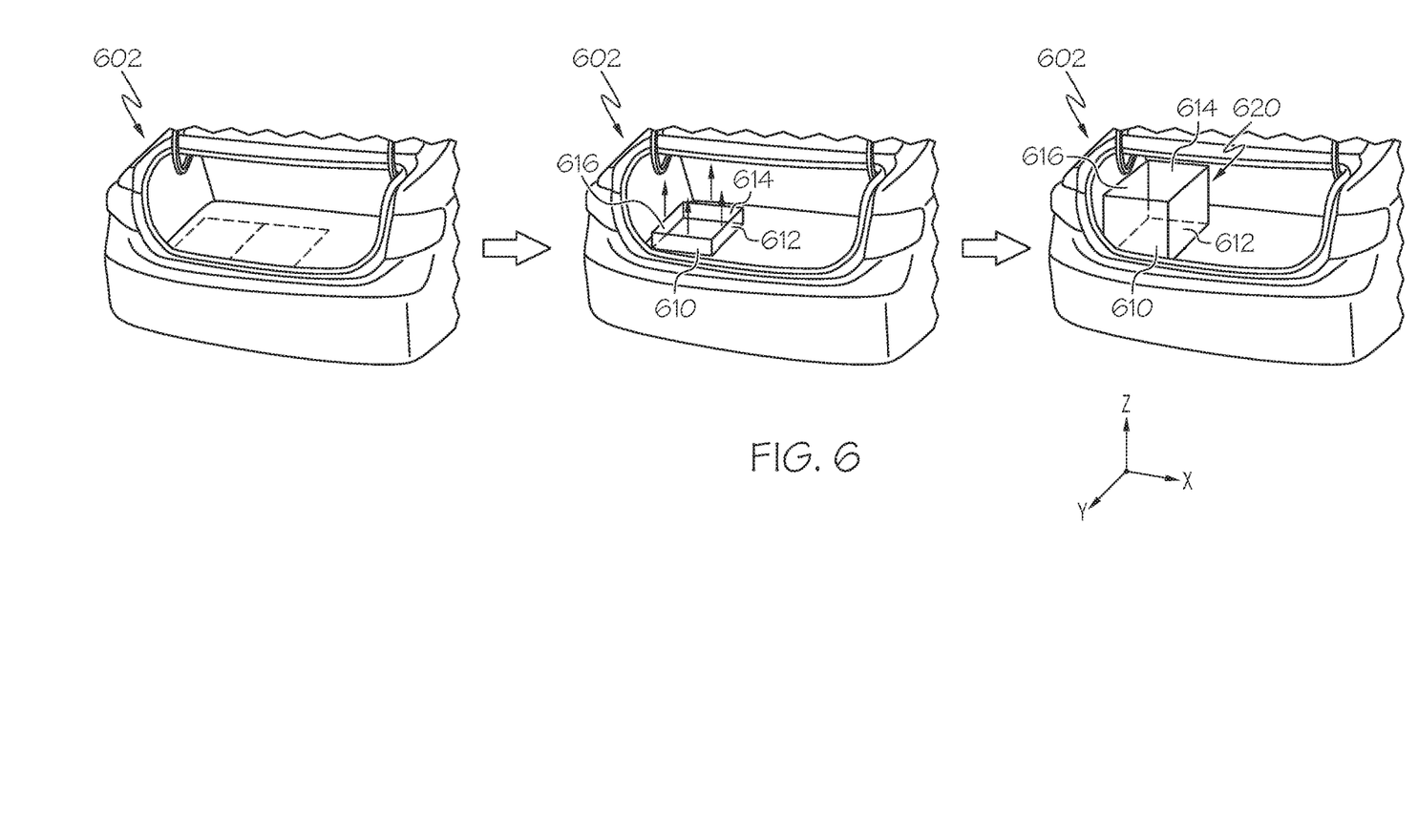
FIG. 6 depicts generating a compartment in a vehicle, according to another embodiment shown and described herein.

In some embodiments, the compartment may include one or more inflatable walls. For example, if the vehicle 110 determines that the item 132 needs to be cooled or heated, the vehicle 110 may provide air into the one or more inflatable walls to build a compartment. The size of the compartment may be adjusted based on information about the item 132, e.g., the dimension of the item 132. The inflatable walls may be horizontal walls or vertical walls that may generate enclosed areas.

Referring back to FIG. 5, in step 570, the vehicle 110 may instruct a temperature control system to cool a compartment of the vehicle in response to determining the item needs to be cooled. By referring to FIGS. 1, 2, and 6, if it is determined that the item 132 needs to be cooled, the vehicle system 200 may instruct the temperature control system, e.g., the temperature control system 208, to cool the compartment 620 of the vehicle 110 such that when the customer 136 arrives at the vehicle 110, the inside of the compartment 620 may be maintained at a relative low temperature, for example, a temperature substantially lower than a vehicle room temperature or the temperature outside of the vehicle.

Figure 7:
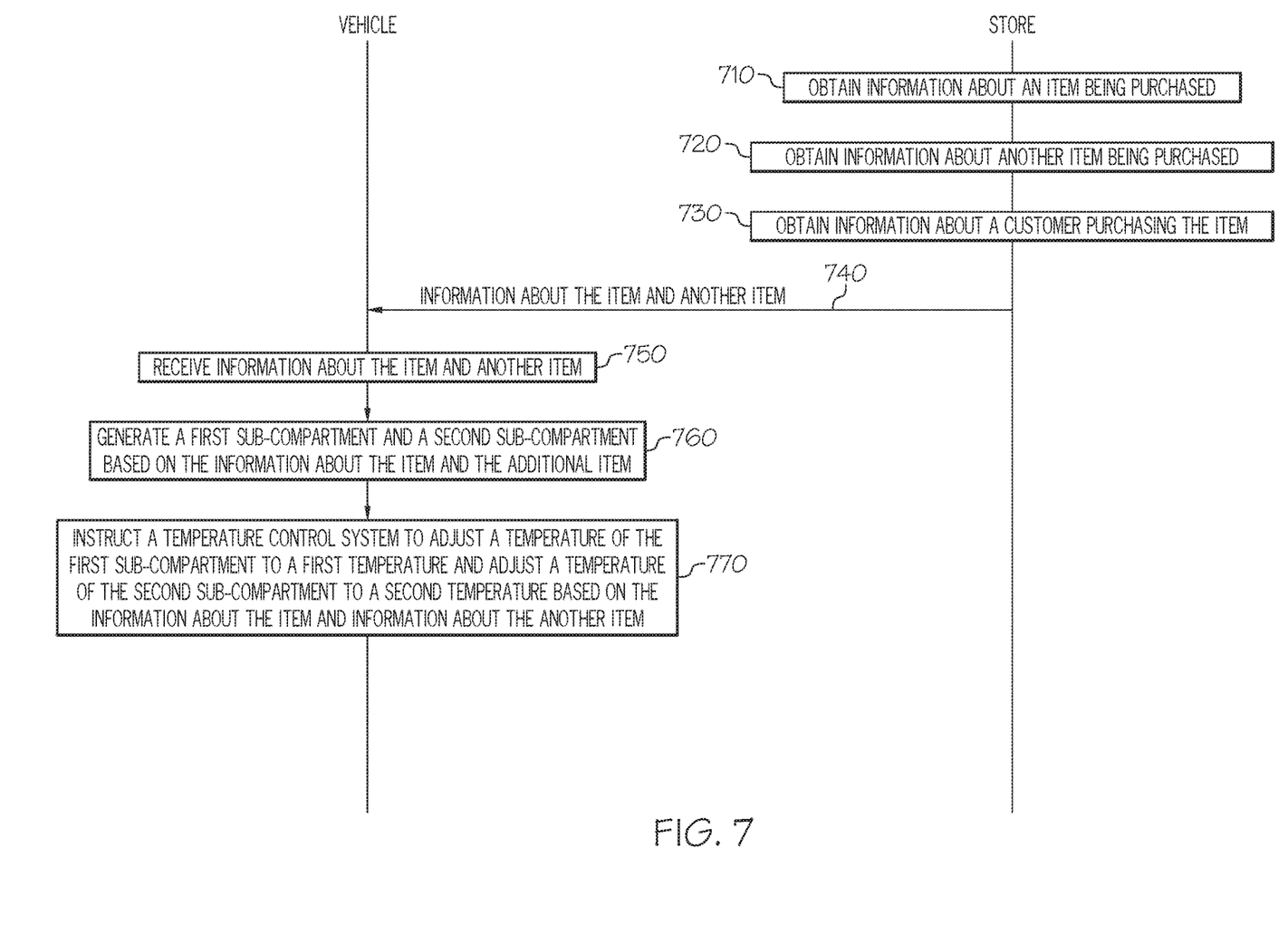
FIG. 7 depicts a flowchart for controlling the temperature of more than one compartment of a vehicle based on information about an item, according to one or more embodiments shown and described herein.

FIG. 7 depicts a flowchart for controlling the temperature of more than one compartments of a vehicle based on information about an item, according to one or more embodiments shown and described herein.

In step 710, the store 120 may obtain information about an item being purchased. In embodiments, by referring to FIG. 1, the customer 136 may purchase an item 132 using the item scanner 134. The item 132 may be a frozen food. The item scanner 134 reads information about the item 132. The information about the item 132 may include, but is not limited to, a dimension of the item, a weight of the item, an expiration date, a desired temperature for storing the item, and storage information with respect to the item (e.g., whether the item needs to be kept frozen, cooled, or the like). The customer 136 may input his membership information when checking out.

Referring back to FIG. 7, in step 720, the store 120 may obtain information about another item being purchased. In embodiments, by referring to FIG. 1, the customer 136 may purchase another item 133 using the item scanner 134. The item 133 may be a rotisserie chicken. The item scanner 134 reads information about the item 133. The information about the item 133 may include, but is not limited to, a dimension of the item, a weight of the item, an expiration date, a desired temperature for storing the item, and storage information with respect to the item (e.g., whether the item needs to be kept frozen, cooled, heated or the like).

Referring back to FIG. 7, in step 730, the store 120 may obtain information about a customer purchasing the items. In embodiments, the server 130 of the store 120 may retrieve information about the customer based on membership information. For example, the item scanner 134 may receive member information about the customer 136 when the customer 136 scans her membership card or inputs her membership information.

Referring back to FIG. 7, in step 740, the store 120 may transmit information about the items to the vehicle 110. In embodiments, by referring to FIG. 1, the server 130 of the store 120 may transmit the information about the items 132 and 133 to the vehicle 110 for the customer 136. For example, the server 130 may retrieve information about the customer based on the membership information and transmit information about the items 132 and 133 to the customer's vehicle 110 based on the customer's information. As another example, the server 130 may transmit the information about the items 132 and 133 to a mobile device 138 of the customer 136. Then, the mobile device 138 may transfer the information about the items 132 and 133 to the vehicle 110 of the customer 136. As another example, the item scanner 134 may transmit information about the scanned items 132 and 133 to the mobile device 138 of the customer 136, which in turn may transmit the information about the scanned items 132 and 133 to the vehicle 110. As another example, the customer 136 may make payments for the items 132 and 133 using the mobile device 138 and the information about the items may be transmitted to the mobile device 138 after making the payments. Then, the mobile device 138 may transmit the information about the items 132 and 133 to the vehicle 110.

Referring back to FIG. 7, in step 750, the vehicle 110 may receive information about the items. For example, the vehicle 110 may receive information about the items 132 and 133 from the server 130 via vehicle-to-everything (V2X) communication or via the network 222. As another example, the vehicle 110 may receive information about the items 132 and 133 from the mobile device 138 of the customer 136 via the network 222.

Referring back to FIG. 7, n step 760, the vehicle 110 may generate a first sub-compartment and a second sub-compartment based on the information about the items. For example, by referring to FIGS. 1 through 3, the vehicle system 200 may determine that the item 132 needs to be cooled or frozen based on the information about the item 132. In addition, the vehicle system 200 may determine that the item 133 needs to be heated based on the information about the item 133. Then, the vehicle system 200 may generate a first sub-compartment and a second sub-compartment, for example, the compartment 310 and the compartment 320 as shown in FIG. 3. The first compartment 310 and the second compartment 320 may be generated in a similar way as described above with reference to FIG. 6.

Referring back to FIG. 7, in step 770, the vehicle 110 may instruct a temperature control system to adjust a temperature of the first sub-compartment to a first temperature and adjust a temperature of the second sub-compartment to a second temperature based on the information about the item and information about the another item. For example, by referring to FIGS. 1 through 3, if it is determined that the item 132 needs to be cooled, the vehicle system 200 may instruct the temperature control system, e.g., the temperature control system 208, to cool the compartment 310 of the vehicle 110 such that when the customer 136 arrives at the vehicle 110, the inside of the compartment 310 may be maintained at a relative low temperature, for example, a temperature substantially lower than a vehicle room temperature or the temperature outside of the vehicle. If it is determined that the item 133 needs to be heated, the vehicle system 200 may instruct a temperature control system, e.g., the temperature control system 208 to heat the compartment 320 of the vehicle 110 such that when the customer 136 arrives at the vehicle 110, the inside of the compartment 320 may be maintained at a relatively high temperature, for example, a temperature substantially higher than a room temperature or temperature outside. The identification of the compartments 310 and 320 along with temperatures thereof may be transmitted to the mobile device 138 of the customer 136. In this regard, the customer 136 may place the item 132 to the compartment 310 and place the item 133 to the compartment 320 to keep the item 132 being cooled or frozen and keep the item 133 being heated.

It should be understood that embodiments described herein provide for vehicle systems for controlling a temperature of a compartment for storing items recently purchased. The vehicle system includes a compartment, one or more processors, one or more memory modules communicatively coupled to the one or more processors; and machine readable instructions stored in the one or more memory modules that, when executed by the one or more processors, cause the one or more processors to receive information about an item; determine whether the item needs to be temperature controlled based on the information; and instruct a temperature control system to adjust a temperature of the compartment of the vehicle in response to determining the item needs to be temperature controlled. The vehicle system may instruct a temperature control system to cool or heat the compartment of the vehicle if it is determined that the item needs to be cooled or heated. In this regard, the vehicle system may provide compartments with proper temperature for storing purchased items. For example, when a customer buys a carton of milk or eggs at a store on a hot summer day, the vehicle system cools the enclosed space of the compartment of the vehicle such that the milk or the eggs may be stored in the cooled space for an extended period of time without being spoiled. In addition, the vehicle system according to the present disclosures enhances energy efficiency for cooling an item by generating a compartment of a size comparable to the size of the item.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a controller programmed to:
receive information about an item from a store;
determine whether the vehicle is within a threshold distance of the store;
determine whether the item needs to be temperature controlled based on the information;
provide air to inflatable walls to build a compartment within a trunk of the vehicle based on the information about the item; and
instruct a temperature control system to adjust a temperature of the compartment of the vehicle by supplying cooled or heated air to the compartment through an inlet at a base of the trunk of the vehicle in response to determining the item needs to be temperature controlled and determining that the vehicle is within the threshold distance of the store, the compartment comprises the inflatable walls and the base of the trunk, wherein
the inflatable walls are integrated within apertures disposed in the base of the trunk of the vehicle,
the inflatable walls are configured to be fully inflated in response to air being provided to the inflatable walls, and
the fully inflated inflatable walls fit within the trunk.

2. The vehicle of claim 1, wherein:
the information about the item includes dimension information about the item; and
the controller is further programmed to:
adjust a size of the compartment of the vehicle based on the information about the item.

3. The vehicle of claim 1, wherein the controller is further programmed to:
determine whether the item needs to be cooled based on the information; and
instruct the temperature control system to cool the compartment of the vehicle in response to determining the item needs to be cooled.

4. The vehicle of claim 1, wherein the controller is further programmed to:
determine whether the item needs to be heated based on the information; and
instruct the temperature control system to heat the compartment of the vehicle in response to determining the item needs to be heated.

5. The vehicle of claim 1, wherein the controller is further programmed to:
receive additional information about an additional item;
prepare a first sub-compartment and a second sub-compartment based on the information about the item and the additional item; and
instruct the temperature control system to adjust a temperature of the first sub-compartment to a first temperature and adjust a temperature of the second sub-compartment to a second temperature based on the information about the item and the additional item.

6. The vehicle of claim 1, wherein the compartment is located within a passenger cabin of the vehicle.

7. A system comprising:
a server; and
a vehicle comprising:
  a controller programmed to
    receive information about an item from a store;
    determine whether the vehicle is within a threshold distance of the store;
    determine whether the item needs to be temperature controlled based on the information;
    provide air to inflatable walls to build a compartment within a trunk of the vehicle based on the information about the item; and
    instruct a temperature control system to adjust a temperature the compartment of the vehicle by supplying cooled or heated air to the compartment through an inlet at a base of the trunk of the vehicle in response to determining the item needs to be temperature controlled and determining that the vehicle is within the threshold distance of the store, the compartment comprises the inflatable walls and the base of the trunk, wherein
    the inflatable walls are integrated within apertures disposed in the base of the trunk of the vehicle,
    the inflatable walls are configured to be fully inflated in response to air being provided to the inflatable walls, and
    the fully inflated inflatable walls fit within the trunk.

8. The system of claim 7, wherein the server is configured to:
communicate with a reader configured to read information about the item; and
transmit information about the item to the vehicle.

9. The system of claim 7, wherein the server is configured to:
communicate with a reader configured to read information about the item;
retrieve information about a customer purchasing the item; and
transmit information about the item to the vehicle based on the information about the customer.

10. The system of claim 9, wherein the server is configured to:
retrieve the information about the customer purchasing the item based on membership information.

11. The system of claim 7, wherein:
the information about the item includes dimension information about the item; and
the controller is further programmed to:
adjust a size of the compartment of the vehicle based on the information about the item.

12. The system of claim 7, wherein the controller is further programmed to:
determine whether the item is a frozen item based on the information about the item;
determine that the item needs to be cooled in response to determination that the item is the frozen item; and
instruct the temperature control system to cool the compartment of the vehicle in response to determining the item needs to be cooled.

13. The system of claim 7, wherein the controller is further programmed to:
determine whether the item needs to be heated based on the information; and
instruct the temperature control system to heat the compartment of the vehicle in response to determining the item needs to be heated.

14. The system of claim 7, wherein the controller is further programmed to:
receive information about an additional item;
prepare a first sub-compartment and a second sub-compartment based on the information about the item and the additional item; and
instruct the temperature control system to adjust a temperature of the first sub-compartment to a first temperature and adjust a temperature of the second sub-compartment to a second temperature.

15. A method for controlling a compartment of a vehicle, the method comprising:
receiving, by a network interface hardware of the vehicle, information about an item, from a store;
determining whether the vehicle is within a threshold distance of the store;
determining, by one or more processors of the vehicle, whether the item needs to be temperature controlled based on the information;
providing air to inflatable walls to build a compartment within a trunk of the vehicle based on the information about the item; and
adjusting, by a temperature control system of the vehicle, a temperature of the compartment of the vehicle by supplying cooled or heated air to the compartment through an inlet at a base of the trunk of the vehicle in response to determining the item needs to be temperature controlled and determining that the vehicle is within the threshold distance of the store, the compartment comprises the inflatable walls and the base of the trunk, wherein
  the inflatable walls are integrated within apertures disposed in the base of the trunk of the vehicle,
  the inflatable walls are configured to be fully inflated in response to air being provided to the inflatable walls, and
  the fully inflated inflatable walls fit within the trunk.

16. The method of claim 15, further comprising:
adjusting a size of the compartment of the vehicle based on the information about the item.

17. The method of claim 15, further comprising:
receiving information about an additional item;
preparing a first sub-compartment and a second sub-compartment based on the information about the item and the additional item; and
adjusting, by the temperature control system of the vehicle, a temperature of the first sub-compartment to a first temperature and adjusting a temperature of the second sub-compartment to a second temperature.

18. The vehicle of claim 1, wherein the controller is further programmed to:
transmit identification of the compartment along with temperature of the compartment to a mobile device of a customer.

* * * * *

UNITED STATES PATENT AND TRADEMARK OFFICE
CERTIFICATE OF CORRECTION

| | |
|---|---|
| PATENT NO. | : 11,772,448 B2 |
| APPLICATION NO. | : 16/690919 |
| DATED | : October 3, 2023 |
| INVENTOR(S) | : Armin Lange |

It is certified that error appears in the above-identified patent and that said Letters Patent is hereby corrected as shown below:

On the Title Page

Item (54) and in the Specification Column 1, Line 3, title, delete "HEMS" and insert --ITEMS--, therefor.

In Column 1, item (56), Foreign patent documents, delete "05/2015" and insert --05/2012--, therefor.

In Column 1 item (57), abstract, Line(s) 1, after "control", delete "a" and insert --the--, therefor.

In the Specification

In Column 3, Line(s) 66, delete "relative low" and insert --relatively low--, therefor.

In Column 5, Line(s) 46, after "control", delete "a" and insert --the--, therefor.

In Column 10, Line(s) 13, after "Referring back", delete "go" and insert --to--, therefor.

In Column 10, Line(s) 36, delete "relative low" and insert --relatively low--, therefor.

In Column 11, Line(s) 61, delete "relative low" and insert --relatively low--, therefor.

In Column 13, Line(s) 24, delete "relative low" and insert --relatively low--, therefor.

In the Claims

In Column 15, Line(s) 6, Claim 7, after "programmed to", insert --:--, therefor.

Signed and Sealed this
Twenty-third Day of January, 2024

*Katherine Kelly Vidal*

Katherine Kelly Vidal
*Director of the United States Patent and Trademark Office*